Figure 1:
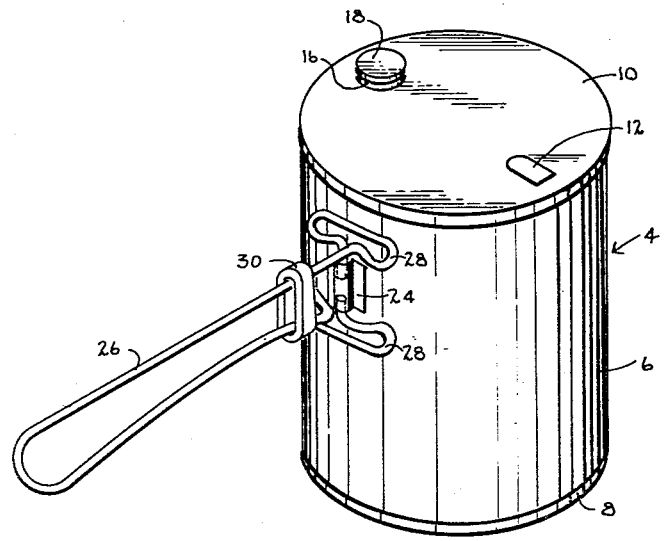

Aug. 15, 1961   A. D. HOWLAND   2,995,998
THROWAWAY COFFEE OR TEA MAKER

Filed Sept. 16, 1957

INVENTOR.
A. D. HOWLAND

BY
*John H. Widdowson*
ATTORNEY

2,995,998
Patented Aug. 15, 1961

2,995,998
THROWAWAY COFFEE OR TEA MAKER
Abner D. Howland, 1957 S. Madison, Wichita, Kans.
Filed Sept. 16, 1957, Ser. No. 684,125
2 Claims. (Cl. 99—321)

This invention relates to drinks made of coffee or tea. In a more specific aspect this invention relates to means for making coffee or tea drinks. In a still more specific aspect this invention relates to throwaway coffee or tea making means, which is particularly suitably used out of doors. Yet a more specific aspect of this invention relates to a disposable can, which is specially designed for making tea or coffee, such can being designed for use out of doors in a camp, along a stream or on an outing.

There are many known means for making coffee, such as a common percolator, means wherein water is slowly passed through the coffee known commonly as a dripolator, and vacuum type coffee making means wherein the hot water is forced into contact with the coffee in fine granulated form. All of these means have their disadvantages when it is attempted to use them out of doors. Chief among the disadvantages is that they are very inconvenient to use and to clean up after use. They of course are too expensive to throw away when they have been used to make the coffee. Also, it is known that coffee can be made by simply pouring granulated coffee into boiling water which has been heated in a can. Such is not satisfactory because of inconvenience, it being difficult to handle the can which is always hot and such necessitating the availability and use of a cloth or the like in which to wrap the granulated coffee prior to immersing same in the hot water. I have invented new coffee making means which overcomes all of the disadvantages of the coffee making means of the prior art when it is attempted to use them out of doors, in for example, a camp or on an outing. The new coffee making means of my invention is of the throwaway or disposable type. It is self-contained and conveniently provides means for handling the coffee after it has been made on an open campfire or grill. The simplicity of the new coffee making means of my invention makes it relatively inexpensive to throw the maker away after use in the manner of a paper plate, a can for other types of drinks, and the like. The new coffee making means of my invention is easy and economical to make, and convenient to use and dispose of.

The new disposable coffee or tea maker of my invention is in the form of a can. The can has an inlet and an outlet opening in the top thereof. Pouring means is mounted in the outlet opening and such means is adapted to cover the outlet opening when desired. The pouring means is used to pass liquid from the can, either coffee or tea drink made therein. The can has removable means which are adapted to cover the inlet opening, and this inlet opening is such that water and coffee and tea can be introduced into the can therethrough to make the coffee or tea drink therefrom. The can has means for receiving handle means with which to handle the can during the making of the coffee and for pouring the coffee therefrom through the spout in the top of the can. I prefer that these means be of the removable kind so that the handle can be used with numerous disposable coffee maker cans.

It is an object of my invention to provide new coffee or tea making means.

It is another object of my invention to provide a new disposable can for making coffee or tea drink.

Still another object of my invention is to provide a new throwaway coffee or tea maker which is particularly suitably designed for use out of doors in a camp or on an outing.

It is still another object of my invention to provide new throwaway coffee or tea making means which is self-contained, and which can be made easily and inexpensively, and which is convenient to use and dispose of.

Other objects and advantages of the new coffee or tea making means of my invention will become apparent to those skilled in the art upon reading this disclosure.

Drawings accompany and are a part of this disclosure. These drawings depict preferred specific embodiments of the new coffee or tea making means of my invention, and it is to be understood that the drawings are not to unduly limit the scope of my invention.

In the drawings, FIG. 1 is a perspective view of a preferred specific embodiment of new disposable coffee making means of my invention.

Figure 2:
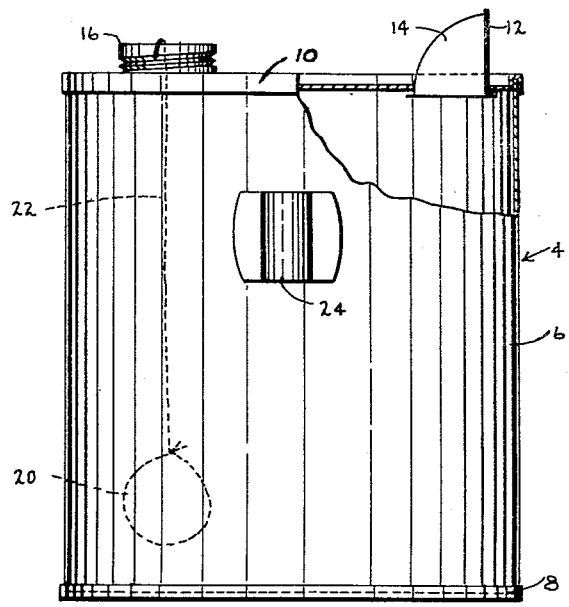

FIG. 2 is a side elevation view partly cut away and with the handle removed of the throwaway coffee maker of FIG. 1.

Following is a discussion and description of the new throwaway coffee or tea making means of my invention made with reference to the drawings whereon the same reference numerals are used to indicate the same or similar parts or structure. The discussion and description is of preferred specific embodiments of my invention, and it is to be understood that such is not to unduly limit the scope of my invention.

The preferred specific coffee or tea maker 4 of the drawings is preferably a closed can preferably made of metal. A tin can of iron or iron alloy coated with tin has been found suitable. Other metal and metal alloys can be used, if desired.

The can proper 6 is preferably cylindrical in shape and has a bottom member 8 attached to the sides in any suitable manner to close the bottom. The coffee or tea maker 4 has a top 10, which is suitably mounted on the sides of can 6 to close the top. This top 10 has an inlet and an outlet opening, prefably spaced and on opposite sides of top 10. The outlet opening has a retractable chute-type spout preferably hingedly mounted in the outlet opening. In using the coffee or tea maker this spout 12 closes the outlet opening in top 10 when the spout is retracted, and when extended, the spout 12 is used to pass liquid from can 6. The spout 12 has spaced sides 14, which retract into can 6. The bottom of the spout 12 joins side members 14. This bottom portion or member closes the outlet opening in top 10 when the spout 12 is in retracted position. The inlet opening in can 6 and top 10 thereof preferably has a threaded projecting rim 16 around the opening. This threaded rim 16 mounts cap 18 to close the inlet opening in top 10. This closure for coffee or tea maker 4 has been found to be advantageous. In operation, coffee or tea is placed in can 4 in porous paper or cloth bag 20, the bag being supported in the can by string 22. Water at or near boiling temperature in can 6 contacts the tea or coffee in bag 20 to brew the tea or coffee, resulting in making the desired drink. It has been found very convenient to merely support bag 20 in can 10 by mounting cap 18 on rim 16 with the outer end of string 22 therebetween. The coffee or tea maker 4 can be sold with bag 20 therein and held therein by string 22 between cap 18 and rim 16, or bag 20 and string 22 can be sold separately for insertion into can 6.

A bracket member 24 is suitably mounted on the outside of can 6. A small piece of metal bent to form a longitudinal passageway with the side of can 6 has been found desirable. This bracket 24 mounts and holds removable handle 26, which is used to lift can 6 on and off the fire, stove, or grill. Handle 26 is preferably a continuous piece of wire bent to form a shank portion having two variably spaced members (as shown). The inner end portions of the wire are bent to form spaced transverse can contacting portions 28 which are preferably curved to fit the contour of the can 6 sides. The very inner ends of the wire are bent to project toward each other in spaced relation. These ends fits into the opposite ends of the longitudinal passageway formed by bracket member 24 and the side of can 6. A ring member 30 is slidably mounted on the shank portion of handle 26. Ring member 30 slides back and forth on the variably spaced shank portions. Rings 30 is placed in the position shown in FIG. 1 of the drawings to join the handle 26 and can 6 for lifting and handling the coffee or tea maker 4. Ring 30 is slid outwardly to a central position to allow removal of handle 26 from can 6. It is preferred to maintain spring tension on handle 26, so that handle 26 and can 6 will automatically disengage upon movement of ring 30 to a central position. Handle 26 can conveniently be reused, and used with cans 6 of different size. In this connection I have found that a suitable size of can 6 is one which will allow the preparation of eight cups of coffee or tea. Of course, smaller or larger sizes can be provided, if desired.

Commercially, the coffee maker 4 is preferably made and sold with the bag of coffee 20 in can 6, and with cap 18 mounted on rim 16 to close the inlet and with chute 12 in retracted position to close the outlet in can 6. In use to make coffee, cap 18 is removed and the can is filled with water. The can full of water and having a bag of coffee 20 therein in placed on the fire and the water brought to a boil. When the coffee is brewed, handle 26 is mounted on can 6 by bracket member 24. Holding this handle 26 allows easy extension of spout 12, and can 6 is tipped while holding handle 26 to pour the coffee drink therefrom. Also, cap 18 is easily removed from the can while holding handle 26, and with cap 18 removed, it is simple to withdraw the bag of coffee grounds 20 from can 6. They are conveniently disposed of. If some of the coffee drink remains in the can 6, it can easily be returned to the fire holding handle 26 to keep it warm for future drinking. After the coffee is all gone, can 6 can be thrown away, after removing handle 26 therefrom. The handle is then usable with other throwaway coffee cans. Tea is preferably brewed by heating the water to boiling and then inserting a tea bag into can 6 through the inlet in top 10.

As will be evident to those skilled in the art, various modifications of my invention can be made, or followed, in the light of this disclosure and discussion, without departing from the spirit or scope of the disclosure or from the scope of the claims.

I claim:

1. A coffee or tea maker comprising, a round, closed, unitary metal can having relatively thin sides, top and bottom and constructed to be thrown away after use, and having an inlet opening and a separate outlet opening in the top, said inlet and outlet openings being positioned adjacent the outer rim of said top and opposite each other, said outlet opening having a retractable chute type spout hingedly mounted therein and operable to close said outlet when retracted and to guide said liquid therefrom when extended, said spout having spaced sides retractable into said can and a bottom, said bottom covering said outlet when said spout is in retracted position, and said spout having a portion extending over said can top when in retracted position, closure means removably mounted on said inlet opening in said top, said inlet opening having means to receive and secure said closure means thereon, a handle receiving bracket rigidly mounted on the outside of the side of said can and having a portion forming with said can a passageway, and a handle removably secured in said bracket on said can, said handle having a shank portion constructed to be received in the hand of the user and spaced contacting portions in the inner end shaped to the contour of said can and removably positioned in said passageway formed by said bracket and can with said spaced contacting portions in contact with said can to removably mount said handle on said can to lift and tip said can into pouring position, and means with said handle to maintain same in operating position on said bracket, and said bracket being constructed and positioned on said can relative to said spout so that said can can be lifted and tipped sideways by said handle to pour liquid from said can through said spout when said spout is extended, a perforate bag of drink producing material selected from the group consisting of coffee and tea, said bag removably positioned in said can and secured to means removably secured in said inlet opening, and said inlet of said can being of size to receive liquid and said perforate bag of drink producing material.

2. A coffee or tea maker comprising, an elongated, round, closed and disposable metal can having relatively thin sides, top and bottom and an inlet opening and a separate outlet opening in the top, a retractable chute-type spout hingedly mounted in said outlet opening and operable to close said outlet when retracted and to pass liquid from said can when extended, said spout having spaced sides retractable into said can and a bottom covering said outlet when said spout is in retracted position, said bottom of said spout having a portion extending over said can top when in retracted position, a threaded projecting rim around said inlet opening in said can and a threaded cap therefor to close said opening, a bracket rigidly mounted on the outside of the side of said can forming therewith a longitudinal passageway, and a reuseably constructed handle removably secured to said can with said bracket to lift and manipulate same and comprising a continuous piece of wire bent to form a shank portion having two members variably spaced, and the inner end portions of said wire being bent to form spaced transverse can contacting members curved to the contour of said can with the ends of said wire projecting toward each other and constructed and operative to fit into opposite ends of said longitudinal passageway to mount said handle on said can, and a ring member slidably mounted on said shank portion of said handle operable upon sliding to force said ends of said wire together and into opposite ends of said passageway to join said can and handle, said bracket constructed and positioned on said can relative to said spout that with said handle mounted in said bracket said can can be lifted and tipped sideways by said handle to pour liquid from said can through said spout when extended, and said inlet of said can of size to receive water and a bag or coffee or tea to make a coffee or tea drink therefrom, respectively, and a perforate bag of drink producing material selected from the group consisting of coffee and tea, said bag secured to means removably secured in said inlet opening with said bag suspended in said can and said bag being of size to be introduceable into said can through said inlet opening.

References Cited in the file of this patent

UNITED STATES PATENTS

| | | |
|---|---|---|
| 430,984 | Benvenisti | June 24, 1890 |
| 1,520,006 | Brucker | Dec. 23, 1924 |
| 1,596,415 | Enright | Aug. 17, 1926 |
| 1,624,745 | Kuhnast | Apr. 12, 1927 |
| 1,702,243 | Axtell | Feb. 19, 1929 |
| 1,734,608 | Anderson | Nov. 5, 1929 |
| 2,539,771 | Chambers | Jan. 30, 1951 |

FOREIGN PATENTS

| | | |
|---|---|---|
| 7,958 | Great Britain | 1900 |
| 15,953 | Great Britain | 1910 |
| 346,102 | Great Britain | Apr. 9, 1931 |
| 136,457 | Australia | Feb. 21, 1950 |